US012090839B2

(12) United States Patent
Iijima

(10) Patent No.: US 12,090,839 B2
(45) Date of Patent: Sep. 17, 2024

(54) FUEL CELL VEHICLE

(71) Applicant: SUBARU CORPORATION, Tokyo (JP)

(72) Inventor: Takaya Iijima, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 265 days.

(21) Appl. No.: 17/481,493

(22) Filed: Sep. 22, 2021

(65) Prior Publication Data

US 2022/0097516 A1     Mar. 31, 2022

(30) Foreign Application Priority Data

Sep. 30, 2020    (JP) ................................ 2020-164415

(51) Int. Cl.
*B60K 15/067*     (2006.01)
*B60L 50/71*     (2019.01)
(Continued)

(52) U.S. Cl.
CPC ............ *B60K 15/067* (2013.01); *B60L 50/71* (2019.02); *B60K 2015/03328* (2013.01); *B60K 2015/0634* (2013.01); *B60K 2015/0675* (2013.01)

(58) Field of Classification Search
CPC .......... B60K 15/067; B60K 2015/0675; B60K 2015/0634; B60K 2015/03328; B60K 2015/03388; B60L 50/71; B60L 50/72
See application file for complete search history.

(56) References Cited

U.S. PATENT DOCUMENTS 4,457,525 A    7/1984   Tanaka et al.
5,658,013 A *   8/1997   Bees ...................... B60K 15/03
                                                                  280/834
(Continued)

FOREIGN PATENT DOCUMENTS

CN           110356222 A     10/2019
DE         102017004902 A1    11/2018
(Continued)

OTHER PUBLICATIONS

Office Action mailed Jan. 23, 2024 in Japanese Patent Application No. 2020-164415 (2 Pages Japanese; 4 Pages English Translation).

*Primary Examiner* — Jeffrey J Restifo
(74) *Attorney, Agent, or Firm* — Smith, Gambrell & Russell, LLP

(57) ABSTRACT

A fuel cell vehicle includes fuel tanks, a first support mechanism, and a restricting member. The fuel tanks are disposed in a vehicle width direction to have longitudinal directions along a vehicle longitudinal direction. The fuel tanks include first and second fuel tanks. The first fuel tank is provided on an outer side in the vehicle width direction. The second fuel tank is adjacent to the first fuel tank. The second fuel tank has an axial center positioned higher than an axial center of the first fuel tank. In a case where a collision load acts from outside in the vehicle width direction, the first support mechanism supports the first fuel tank while allowing the first fuel tank to move toward a lower side of the second fuel tank. The restricting member is provided above the second fuel tank and restricts an upward movement range of the second fuel tank.

9 Claims, 5 Drawing Sheets

(51) Int. Cl.
   *B60K 15/03*      (2006.01)
   *B60K 15/063*     (2006.01)

(56) References Cited

U.S. PATENT DOCUMENTS

| | | | | |
|---|---|---|---|---|
| 6,227,230 | B1* | 5/2001 | Huh | F17C 3/00 |
| | | | | 137/255 |
| 11,008,041 | B2* | 5/2021 | Inoue | B62D 21/15 |
| 2002/0121772 | A1* | 9/2002 | Koster | B60K 15/063 |
| | | | | 280/830 |
| 2003/0189334 | A1* | 10/2003 | Kawasaki | B60K 1/04 |
| | | | | 280/834 |
| 2004/0101745 | A1* | 5/2004 | Kawasaki | B60L 50/71 |
| | | | | 429/96 |
| 2006/0027406 | A1* | 2/2006 | Borroni-Bird | H01M 8/04208 |
| | | | | 280/831 |
| 2006/0033322 | A1* | 2/2006 | Suess | B60K 15/07 |
| | | | | 280/830 |
| 2007/0119646 | A1* | 5/2007 | Minami | B60K 15/067 |
| | | | | 280/834 |
| 2008/0023957 | A1* | 1/2008 | Diehl | B60K 15/07 |
| | | | | 280/834 |
| 2008/0111048 | A1* | 5/2008 | Jang | B62D 21/155 |
| | | | | 248/562 |
| 2008/0283316 | A1* | 11/2008 | Ono | B60K 15/063 |
| | | | | 180/68.5 |
| 2009/0309349 | A1* | 12/2009 | Yamanami | B60K 15/07 |
| | | | | 280/830 |
| 2010/0051625 | A1* | 3/2010 | Dandalides | B60K 15/077 |
| | | | | 220/562 |
| 2010/0252353 | A1* | 10/2010 | Tsubokawa | B60K 15/07 |
| | | | | 280/834 |
| 2011/0174856 | A1* | 7/2011 | Hayashi | B60K 15/07 |
| | | | | 224/538 |
| 2011/0259933 | A1* | 10/2011 | Dossow | B60K 15/067 |
| | | | | 224/538 |
| 2012/0080250 | A1* | 4/2012 | Ohashi | B60K 1/04 |
| | | | | 280/834 |
| 2015/0329242 | A1* | 11/2015 | Miyamoto | B60K 15/063 |
| | | | | 248/313 |
| 2015/0367726 | A1* | 12/2015 | Taniguchi | B60K 15/067 |
| | | | | 280/834 |
| 2016/0039282 | A1* | 2/2016 | Mathew | B60K 15/067 |
| | | | | 248/313 |
| 2016/0096495 | A1* | 4/2016 | Sasaki | B60R 16/08 |
| | | | | 248/505 |
| 2016/0097487 | A1* | 4/2016 | Sasaki | B60K 15/067 |
| | | | | 248/505 |
| 2017/0082240 | A1* | 3/2017 | Mlinaric | B60K 15/07 |
| 2017/0240039 | A1* | 8/2017 | Okawachi | B60K 15/07 |
| 2017/0240045 | A1* | 8/2017 | Ohashi | B60K 1/00 |
| 2017/0282709 | A1* | 10/2017 | Sasaki | B60K 15/03006 |
| 2018/0272863 | A1* | 9/2018 | Otsura | B62D 25/20 |
| 2018/0326842 | A1* | 11/2018 | Sawada | B60K 15/07 |
| 2019/0160941 | A1 | 5/2019 | Fujii | |
| 2019/0263450 | A1* | 8/2019 | Inoue | B62D 21/152 |
| 2021/0245811 | A1* | 8/2021 | Murata | B60K 5/1216 |
| 2021/0260994 | A1* | 8/2021 | Gambone | B60K 15/067 |
| 2022/0009347 | A1* | 1/2022 | Katano | B60K 15/03 |
| 2022/0041053 | A1* | 2/2022 | Hirawaki | B60K 1/04 |
| 2022/0097516 | A1* | 3/2022 | Iijima | B60L 50/71 |
| 2022/0105799 | A1* | 4/2022 | Bochicchio De Maria | B60K 15/07 |
| 2022/0144078 | A1 | 5/2022 | Fujii | |
| 2022/0219528 | A1* | 7/2022 | Ogiwara | B60K 15/07 |
| 2022/0402355 | A1* | 12/2022 | Kim | B60K 15/03 |
| 2023/0016788 | A1* | 1/2023 | Choi | B62D 27/00 |
| 2023/0173914 | A1* | 6/2023 | Choi | B60K 15/063 |
| | | | | 280/834 |

FOREIGN PATENT DOCUMENTS

| | | |
|---|---|---|
| JP | S57-199175 U | 12/1982 |
| JP | 2008-143464 A | 6/2008 |
| JP | 2010-111282 A | 5/2010 |
| JP | 2010-247606 A | 11/2010 |
| JP | 2011-042208 A | 3/2011 |
| JP | 2017-100515 A | 6/2017 |
| JP | 2017-144746 A | 8/2017 |
| JP | 2019-098802 A | 6/2019 |
| JP | 2019-147500 A | 9/2019 |

* cited by examiner

FUEL CELL VEHICLE

CROSS-REFERENCE TO RELATED APPLICATIONS

The present application claims priority from Japanese Patent Application No. 2020-164415 filed on Sep. 30, 2020, the entire contents of which are hereby incorporated by reference.

BACKGROUND

The disclosure relates to a fuel cell vehicle.

In recent years, fuel cell vehicles have been put into practical use. Fuel cells are generator that generate electric power through electrochemical reactions between hydrogen gas and oxygen (air). Hydrogen fuel has a low energy density compared with fossil fuel, such as gasoline, and therefore, in order to achieve a long cruising range of a fuel cell vehicle, the fuel load amount is increased more than that of a vehicle that is mounted with an internal combustion engine using gasoline fuel or the like. However, fuel tanks for storing hydrogen fuel are filled with high-pressure hydrogen gas, and thus, the space for mounting the fuel tanks is limited in consideration of safety in case of a collision of the vehicle.

In most fuel cell vehicles that are practically used, in order to prevent damage to the fuel tanks themselves and to peripheral components at the time of a collision of the vehicles, the fuel tanks are arranged so as to have longitudinal directions along the vehicle width direction (hereinafter, which is also called "transverse arrangement"), with spaces therebetween. In another case, Japanese Unexamined Patent Application Publication (JP-A) No. 2008-143464 discloses a fuel tank support device for a fuel cell vehicle including a plurality of transversely arranged fuel tanks at a rear part of the vehicle. The support device includes a releasing member that, at the time of a collision of the vehicle, deforms to make at least a fuel tank on a front side of the vehicle, among the plural fuel tanks, fall off, in order to avoid damage to the fuel tanks due to the action of excessive load.

In one example of a layout of the fuel tanks that is designed to fit the vehicle, JP-A No. 2019-147500 discloses a fuel cell vehicle including fuel tanks in which the longitudinal directions are directed along the vehicle longitudinal direction (hereinafter, which is also called "longitudinal arrangement").

SUMMARY

An aspect of the disclosure provides a fuel cell vehicle including fuel tanks, a first support mechanism, and a restricting member. The fuel tanks are disposed in a vehicle width direction of the fuel cell vehicle so as to have respective longitudinal directions along a vehicle longitudinal direction of the fuel cell vehicle. The fuel tanks include a first fuel tank and a second fuel tank. The first fuel tank is provided on an outer side in the vehicle width direction. The second fuel tank is disposed adjacent to the first fuel tank. The second fuel tank has an axial center that is positioned higher than an axial center of the first fuel tank. The first support mechanism is configured to, in a case where a collision load acts from outside in the vehicle width direction, support the first fuel tank while allowing the first fuel tank to move toward a lower side of the second fuel tank. The restricting member is provided above the second fuel tank, and configured to restrict an upward movement range of the second fuel tank.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
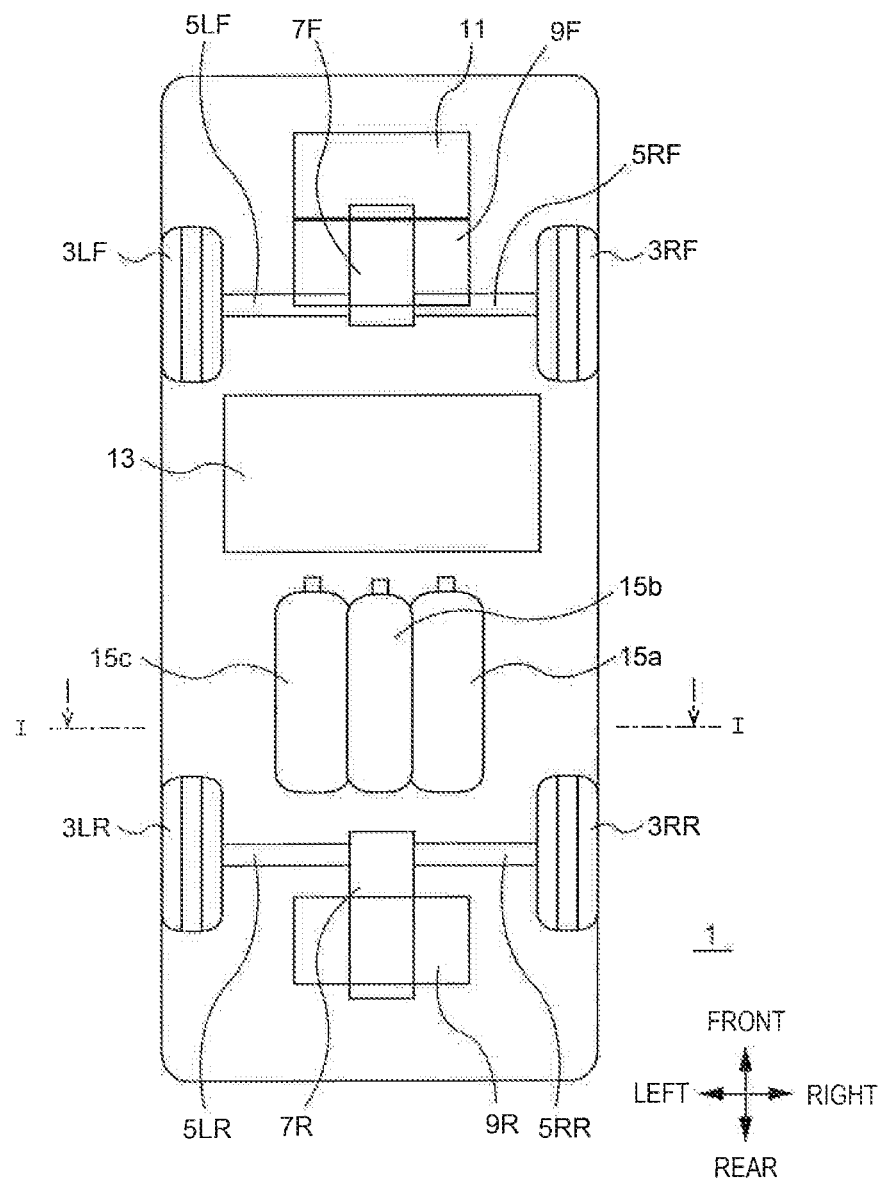
FIG. 1 is a schematic view illustrating a layout of fuel tanks in a fuel cell vehicle according to an embodiment of the disclosure.

At the time of a side collision of the vehicle, a plurality of fuel tanks that are longitudinally arranged may interfere with each other to be damaged, resulting in fuel leakage. In another case, at the time of a side collision of the vehicle, even when fuel tanks move upward, it is necessary to protect occupants in the vehicle cabin.

It is desirable to provide a fuel cell vehicle that is able to reduce damage to a plurality of longitudinally arranged fuel tanks and to protect occupants in a vehicle cabin, at the time of a side collision of the vehicle.

Hereinafter, an embodiment of the disclosure will be described in detail with reference to the accompanying drawings. In the specification and the drawings, elements having substantially the same functional configuration are designated by the same reference numerals, and a duplicate description thereof will be omitted.

1. Layout of Fuel Tanks

First, a layout of fuel tanks in a fuel cell vehicle according to an embodiment of the disclosure will be described.

Figure 2:
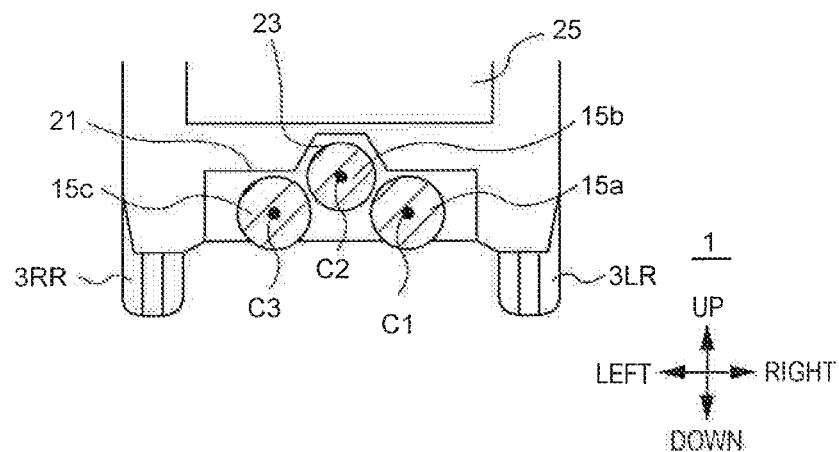
FIG. 2 is a schematic view of a I-I cross section in FIG. 1, as viewed from the arrow direction.

FIGS. 1 and 2 are schematic views illustrating a simplified layout of elements of a fuel cell vehicle (hereinafter, simply referred to as "vehicle") 1 according to this embodiment. FIG. 1 is a schematic plane view of the vehicle 1 as viewed from above. FIG. 2 is a diagram schematically illustrating a I-I cross section in FIG. 1 as viewed from the arrow direction.

The fuel cell vehicle 1 includes a fuel cell 11, a front wheel drive motor 9F, a rear wheel drive motor 9R, a front wheel power transmission 7F, a rear wheel power transmission 7R, a secondary battery 13, a first fuel tank 15a, a second fuel tank 15b, and a third fuel tank 15c.

The fuel cell 11 and the front wheel drive motor 9F are mounted at a front part of the vehicle 1. The driving force that is output from the front wheel drive motor 9F is transmitted to an axle 5LF of a left front wheel 3LF and to an axle 5RF of a right front wheel 3RF via the front wheel power transmission 7F. The front wheel power transmission 7F is composed of, for example, a differential gear and a clutch.

The rear wheel drive motor 9R is mounted at a rear part of the vehicle 1. The driving force that is output from the rear wheel drive motor 9R is transmitted to an axle 5LR of a left rear wheel 3LR and to an axle 5RR of a right rear wheel 3RR via the rear wheel power transmission 7R. As in the case of the front wheel power transmission 7F, the rear wheel power transmission 7R is composed of, for example, a differential gear and a clutch.

The vehicle 1 is mounted with an inverter and a motor control device that are not illustrated. The motor control device controls the inverter to power the front wheel drive motor 9F and the rear wheel drive motor 9R with charged power of the secondary battery 13 and generated power of the fuel cell 11. The motor control device also controls the inverter to regeneratively drive the front wheel drive motor 9F and the rear wheel drive motor 9R so as to charge the secondary battery 13 with the regeneratively generated power.

The fuel cell 11 generates electric power through electrochemical reactions between air (oxygen) and hydrogen gas that is filled in the first fuel tank 15a, the second fuel tank 15b, and the third fuel tank 15c. The generated power of the fuel cell 11 is supplied to the front wheel drive motor 9F and the rear wheel drive motor 9R and is charged in the secondary battery 13. The fuel cell 11 is driven under control of a fuel cell control device, which is not illustrated.

The vehicle 1 according to this embodiment includes three fuel tanks of the first fuel tank 15a, the second fuel tank 15b, and the third fuel tank 15c (hereinafter, equally called "fuel tanks 15" in the case of not distinguishing therebetween). Each of the fuel tanks 15 is longitudinally arranged so as to have the longitudinal directions along the vehicle longitudinal direction. The first fuel tank 15a, the second fuel tank 15b, and the third fuel tank 15c are respectively provided with on-off valves 16a to 16c (hereinafter, equally called as "on-off valves 16" in the case of not distinguishing therebetween) at one ends in the longitudinal direction. The on-off valves 16a to 16c are positioned on a front side of the vehicle body. In the state in which the fuel tanks 15 are longitudinally arranged, the on-off valves 16 are spaced away from a side surface of the vehicle body compared with a case of transversely arranging the fuel tanks. This reduces the possibility of leakage of hydrogen gas due to damage to the on-off valves 16 at the time of a side collision of the vehicle 1, whereby safety is improved.

The first fuel tank 15a, the second fuel tank 15b, and the third fuel tank 15c are arranged in this order from right to left of the vehicle body. The second fuel tank 15b at the middle of the three fuel tanks 15 is disposed adjacent to the first fuel tank 15a or the third fuel tank 15c. An axial center C2 of the second fuel tank 15b is positioned higher than an axial center C1 of the first fuel tank 15a and an axial center C3 of the third fuel tank 15c. The second fuel tank 15b is partially disposed in an upper recess 23 that is provided in a floor bottom surface 21 of the vehicle body (refer to FIG. 2). This enables efficiently using the space for disposing the fuel tanks 15. The upper recess 23 may use, for example, a tunnel part in which a propeller shaft for transmitting a driving force from the front wheel side to the rear wheel side or from the rear wheel side to the front wheel side is disposed, of a related-art vehicle that is mounted with a drive source, such as an engine or a drive motor, at either one of a front part and a rear part.

The fuel cell vehicle 1 according to this embodiment, which includes the front wheel drive motor 9F and the rear wheel drive motor 9R at the front part and the rear part, respectively, is difficult to obtain the space for disposing the fuel tanks 15 at the front part and the rear part of the vehicle 1. For this reason, the three fuel tanks 15 are disposed under a rear seat 25 in the vehicle cabin, between the front wheels 3LF and 3RF and the rear wheels 3LR and 3RR. The fuel tanks 15, which are longitudinally arranged, have the on-off valves 16 that are spaced away from the side surface of the vehicle body. Thus, the fuel tanks 15 can be disposed close to the side surface of the vehicle body. This structure enables increasing the load amount of hydrogen gas, resulting in extension of the cruising range of the fuel cell vehicle 1.

2. Support Structure of Fuel Tanks

Next, a support structure of the fuel tanks 15 of the fuel cell vehicle 1 according to this embodiment will be described.

Figure 3:
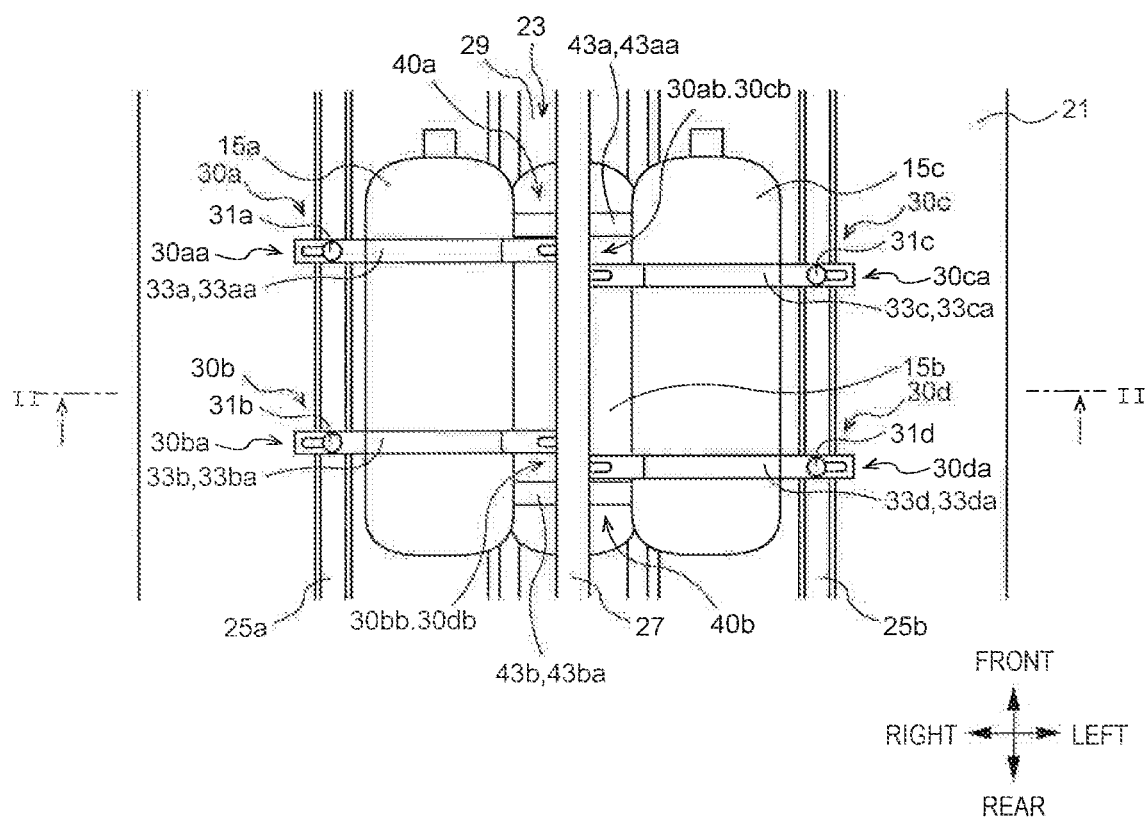
FIG. 3 is a lower side view of a support structure of the fuel tanks.
Figure 4:
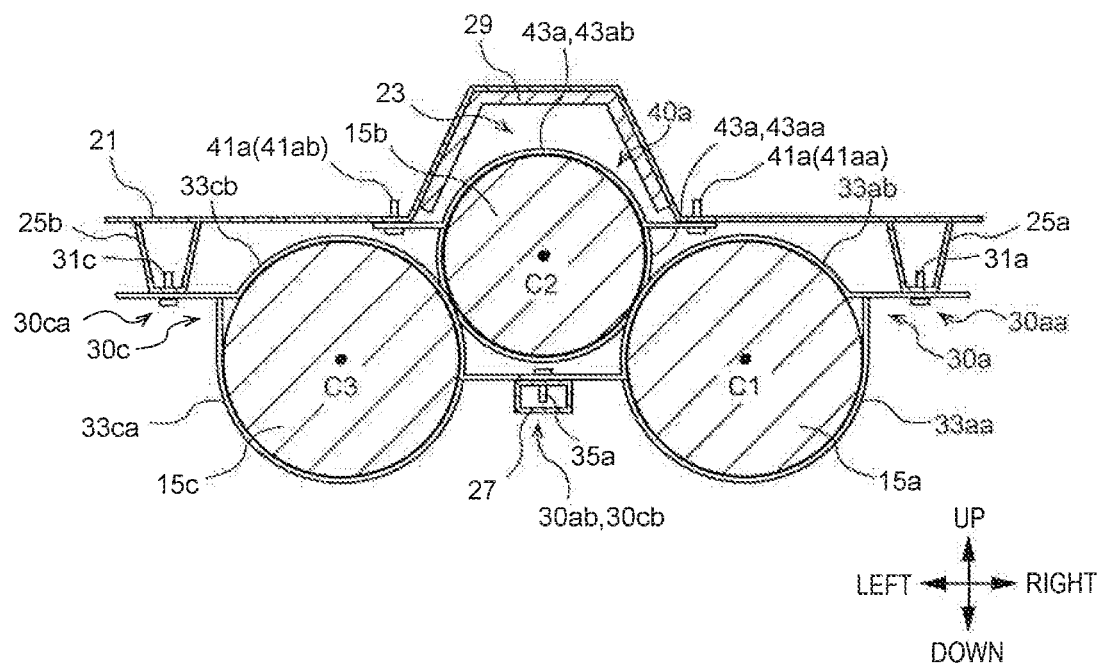
FIG. 4 is a schematic view of a II-II cross section in FIG. 3, as viewed from the arrow direction.
Figure 5:
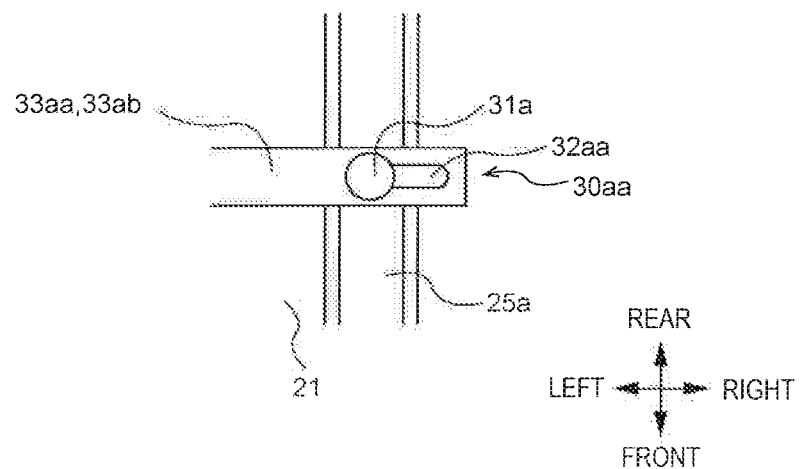
FIG. 5 is a diagram illustrating a structural example of a first fixing part of a first support mechanism.
Figure 6:
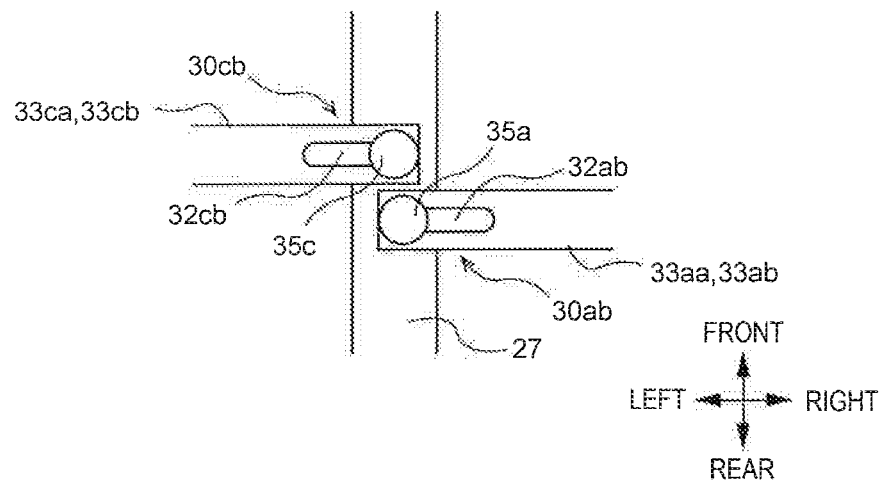
FIG. 6 is a diagram illustrating a structural example of second fixing parts of the first support mechanisms.
Figure 7:
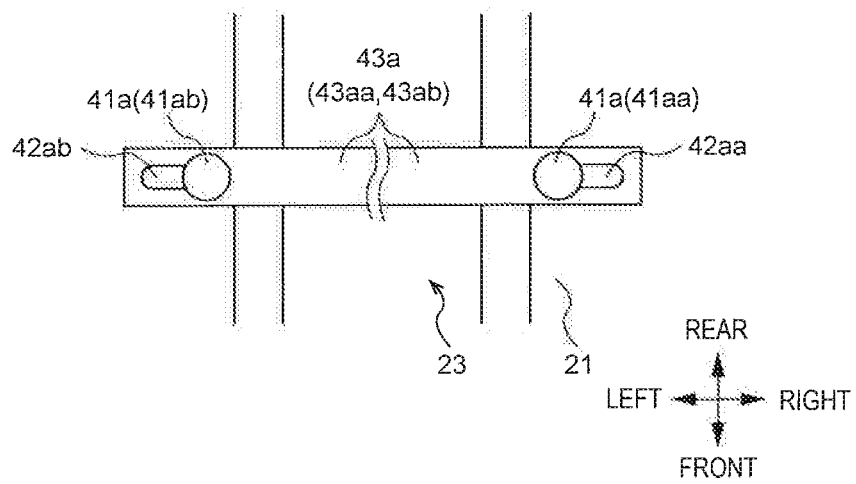
FIG. 7 is a diagram illustrating a structural example of fixing parts of a second support mechanism.

FIGS. 3 to 6 are drawings for illustrating a support structure of the fuel tanks 15. FIG. 3 is a lower side view of the floor bottom surface 21 of the vehicle body. FIG. 4 is a schematic view of a II-II cross section in FIG. 3, as viewed from the arrow direction. FIG. 5 is a diagram illustrating a first fixing part 30aa of a first support mechanism 30a. FIG. 6 is a diagram illustrating second fixing parts 30ab and 30cb of the first support mechanisms 30a and 30c. FIG. 7 is a diagram illustrating a fixing part of a second support mechanism 40a. Note that the up-down direction, the front-rear direction, and the right-left direction are illustrated in each drawing, and the illustrated front-rear direction or right-left direction is reversed in some drawings.

The first fuel tank 15a that is positioned on a right outer side in the vehicle width direction among the three fuel tanks 15 is supported by the first support mechanisms 30a and 30b. The first support mechanisms 30a and 30b support the first fuel tank 15a while allowing the first fuel tank 15a to move downward of the second fuel tank 15b, when a collision load acts from a right outside in the vehicle width direction. The third fuel tank 15c that is positioned on a left outer side in the vehicle width direction among the three fuel tanks 15 is supported by the first support mechanisms 30c and 30d. The first support mechanisms 30c and 30d support the third fuel tank 15c while allowing the third fuel tank 15c to move downward of the second fuel tank 15b, when a collision load acts from a left outside in the vehicle width direction.

The first support mechanisms 30a and 30b support the first fuel tank 15a at two positions on a front side and a rear side in the longitudinal direction of the first fuel tank 15a, respectively. The two first support mechanisms 30a and 30b for supporting the first fuel tank 15a have the same structure. The first support mechanisms 30c and 30d support the third fuel tank 15c at two positions on a front side and a rear side in the longitudinal direction of the third fuel tank 15c, respectively. The first support mechanisms 30c and 30d for supporting the third fuel tank 15c have the same structure as the first support mechanisms 30a and 30b for supporting the first fuel tank 15a, except that right and left are reversed. The following describes the first support mechanism 30a as an example.

The first support mechanism 30a supports, the first fuel tank 15a in the state of being fixed to the vehicle body at the first fixing part 30*aa* on the outer side in the vehicle width direction and at the second fixing part 30*ab* on the center side in the vehicle width direction. The first support mechanism 30*a* includes a first support member 33*a* for supporting the first fuel tank 15*a* and first fixing members 31*a* and 35*a* that fix the first support member 33*a* to the vehicle body. The first support member 33*a* includes a lower bracket 33*aa* and an upper bracket 33*ab* that hold the first fuel tank 15*a* therebetween from upper and lower sides.

The lower bracket 33*aa* and the upper bracket 33*ab* have strengths lower than the strength of the fuel tanks 15 and are made of, for example, belt-shaped resin molded components. The middle in the longitudinal direction of the lower bracket 33*aa* is formed into a shape along the contour of a lower side of the first fuel tank 15*a* and supports the first fuel tank 15*a* from the lower side. The middle in the longitudinal direction of the upper bracket 33*ab* is formed into a shape along the contour of an upper side of the first fuel tank 15*a* and supports the upper side of the first fuel tank 15*a*.

Both side parts of the lower bracket 33*aa* are fixed to the vehicle body in conjunction with both side parts of the upper bracket 33*ab* by the first fixing members 31*a* and 35*a*, respectively. In one example, the side parts on the outer side in the vehicle width direction of the lower bracket 33*aa* and the upper bracket 33*ab* are fixed to a side frame 25*a* of the vehicle body by the first fixing member 31*a* at the first fixing part 30*aa*. The side parts at the middle in the vehicle width direction of the lower bracket 33*aa* and the upper bracket 33*ab* are fixed to a tank support frame 27 by the first fixing member 35*a* at the second fixing part 30*ab*. The tank support frame 27 is provided on a floor of the vehicle body.

Each of the both side parts of the lower bracket 33*aa* and corresponding each of the both side parts of the upper bracket 33*ab* may be mutually joined. Each of the both side parts of the lower bracket 33*aa* and corresponding each of the both side parts of the upper bracket 33*ab*, which are mutually joined, reliably support the first fuel tank 15*a*. In this case, each of the both side parts of the lower bracket 33*aa* and corresponding each of the both side parts of the upper bracket 33*ab* may be joined by adhesive or welding, or may be bound by a binding band or the like.

FIG. 5 is a lower side view of the first fixing part 30*aa*. The lower bracket 33*aa* and the upper bracket 33*ab* have long holes 32*aa* at ends on the outer side in the vehicle width direction. The long holes 32*aa* have a longitudinal direction along the vehicle width direction. The long holes 32*aa* penetrate through the lower bracket 33*aa* and the upper bracket 33*ab*. The first fixing member 31*a* is, for example, a bolt, a screw, or a rivet, and passes through the long holes 32*aa* to be fixed to the side frame 25*a*. The first fixing member 31*a* is positioned on the center side in the vehicle width direction in the long hole 32*aa*. Thus, upon being strongly pulled toward the center side in the vehicle width direction, the lower bracket 33*aa* and the upper bracket 33*ab* move toward the center side in the vehicle width direction along the long holes 32*aa*.

In order to allow the lower bracket 33*aa* and the upper bracket 33*ab* to move toward the center side in the vehicle width direction, at least parts of the long holes 32*aa* exist on the outer side in the vehicle width direction than the first fixing member 31*a*. The first fixing member 31*a* may not be disposed on the center side in the vehicle width direction in the long holes 32*aa*.

The lower bracket 33*aa* and the upper bracket 33*ab* have long holes 32*ab* at ends on the center side in the vehicle width direction. The long holes 32*ab* have a longitudinal direction along the vehicle width direction. The long holes 32*ab* penetrate through the lower bracket 33*aa* and the upper bracket 33*ab*. As in the case of the first fixing member 31*a*, the first fixing member 35*a* passes through the long holes 32*ab* to be fixed to the tank support frame 27. The first fixing member 35*a* is positioned on the center side in the vehicle width direction in the long holes 32*ab*. Thus, upon being strongly pulled toward the center side in the vehicle width direction, the lower bracket 33*aa* and the upper bracket 33*ab* move toward the center side in the vehicle width direction along the long holes 32*ab*.

FIG. 6 is an upper side view of the second fixing part 30*ab*. Note that FIG. 6 illustrates a second fixing part 30*cb* of the first support mechanism 30*c* for supporting the third fuel tank 15*c*, in addition to the second fixing part 30*ab* of the first support mechanism 30*a* for supporting the first fuel tank 15*a*.

The lower bracket 33*aa* and the upper bracket 33*ab* have long holes 32*ab* at ends on the center side in the vehicle width direction. The long holes 32*ab* have a longitudinal direction along the vehicle width direction. The long holes 32*ab* penetrate through the lower bracket 33*aa* and the upper bracket 33*ab*. As in the case of the first fixing member 31*a*, the first fixing member 35*a* passes through the long holes 32*ab* to be fixed to the tank support frame 27. The first fixing member 35*a* is positioned on the center side in the vehicle width direction in the long holes 32*ab*. Thus, upon being strongly pulled toward the center side in the vehicle width direction, the lower bracket 33*aa* and the upper bracket 33*ab* move toward the center side in the vehicle width direction along the long holes 32*ab*.

Also as to the long holes 32*ab* that are formed at the ends on the center side in the vehicle width direction of the lower bracket 33*aa* and the upper bracket 33*ab*, at least parts of the long holes 32*ab* exist on the right outer side in the vehicle width direction than the first fixing member 35*a*. The first fixing member 35*a* may not be disposed on the center side in the vehicle width direction in the long holes 32*ab*. The long holes 32*ab* may have a U-shape that opens to a side opposite to the first fuel tank 15*a*. However, in order to prevent the first fuel tank 15*a* from falling off due to dislocation of the lower bracket 33*aa* and the upper bracket 33*ab* by vibrations or the like, the long holes 32*ab* have a closed slit shape in some embodiments.

The first support mechanism 30*b* for supporting the rear side of the first fuel tank 15*a* is structured in a manner similar to the first support mechanism 30*a*. In addition, the first support mechanisms 30*c* and 30*d* for supporting the third fuel tank 15*c*, which is disposed on the left outer side in the vehicle width direction, are structured in a manner similar to the first support mechanism 30*a*, except that right and left are inverted. That is, the first support mechanism 30*c* for supporting the third fuel tank 15*c* includes a first support member 33*c* having a lower bracket 33*ca* and an upper bracket 33*cb* and also includes first fixing members 31*c* and 35*c* that fix the first support member 33*c* to the vehicle body.

The first support mechanism 30*c* supports the third fuel tank 15*c* while allowing the third fuel tank 15*c* to move downward of the second fuel tank 15*b*, when a collision load acts from the left outside in the vehicle width direction. The first support mechanism 30*d* for supporting the rear side of the third fuel tank 15*c* is structured in a manner similar to the first support mechanism 30*c*.

The second fuel tank 15*b*, which is disposed in the middle of the three fuel tanks 15, is supported by second support mechanisms 40*a* and 40*b*. The second support mechanisms 40*a* and 40*b* support the second fuel tank 15*b* at two positions on a front side and a rear side in the longitudinal direction of the second fuel tank 15b, respectively. The two second support mechanisms 40a and 40b for supporting the second fuel tank 15b have the same structure. The following describes the second support mechanism 40a as an example.

The second support mechanism 40a includes a second support member 43a for supporting the second fuel tank 15b and second fixing members 41a that fix the second support member 43a to the vehicle body. The second support member 43a includes a lower bracket 43aa and an upper bracket 43ab that hold the second fuel tank 15b therebetween from upper and lower sides.

The lower bracket 43aa and the upper bracket 43ab have strengths lower than the strength of the fuel tanks 15 and are made of, for example, belt-shaped resin molded components. The middle in the longitudinal direction of the lower bracket 43aa is formed into a shape along the contour of a lower side of the second fuel tank 15b and supports the second fuel tank 15b from the lower side. The middle in the longitudinal direction of the upper bracket 43ab is formed into a shape along the contour of an upper side of the second fuel tank 15b and supports the upper side of the second fuel tank 15b.

Both side parts of the lower bracket 43aa are fixed to the floor bottom surface 21 of the vehicle body in conjunction with both side parts of the upper bracket 43ab by the second fixing members 41aa and 41ab, respectively. The both side parts of the lower bracket 43aa and the upper bracket 43ab are fixed to both sides of the upper recess 23, which is provided in the floor bottom surface 21. Also as to the second support member 43a, each of the both side parts of the lower bracket 43aa and corresponding each of the both side parts of the upper bracket 43ab may be mutually joined.

FIG. 7 is a lower side view of the fixing parts at the both side parts of the second support member 43a. In FIG. 7, the middle of the second support member 43a for supporting the second fuel tank 15b is omitted. The second support member 43a has long holes 42aa and 42ab at ends of the both side parts. The long holes 42aa and 42ab have a longitudinal direction along the vehicle width direction. The long holes 42aa and 42ab penetrate through the lower bracket 43aa and the upper bracket 43ab.

As in the case of the first fixing member 31a, the second fixing members 41a are, for example, bolts, screws, or rivets and respectively pass through the long holes 42aa and 42ab to be fixed to the floor bottom surface 21. The second fixing members 41a are positioned on the center side in the vehicle width direction in the long holes 42aa and 42ab, respectively. Thus, upon being strongly pulled toward the center side in the vehicle width direction, the lower bracket 43aa and the upper bracket 43ab move toward the center side in the vehicle width direction along the long holes 42aa and 42ab.

Also, the long holes 42aa and 42ab may have a U-shape that opens to the outer side in the vehicle width direction. However, in order to prevent them from coming off from the second fixing members 41a, they are closed slit-shaped long holes 42aa and 42ab in some embodiments.

In the support structure of the fuel tanks 15 thus constructed, the second fuel tank 15b, which is positioned in the middle of the three fuel tanks 15, and the first fuel tank 15a and the third fuel tank 15c, partially overlap with one another in the up-down direction (refer to FIGS. 3 and 4). The axial center C2 of the second fuel tank 15b is positioned higher than the axial center C1 of the first fuel tank 15a and the axial center C3 of the third fuel tank 15c on the outer sides in the vehicle width direction. The second fuel tank 15b is partially positioned in the upper recess 23 in the floor bottom surface 21 (refer to FIG. 4).

A restricting member 29 is provided on an inner surface of the upper recess 23. The restricting member 29 is disposed above the second fuel tank 15b and restricts the upward movement range of the second fuel tank 15b. The restricting member 29 has strength higher than the strengths of at least the floor bottom surface 21 and the fuel tanks 15 and prevents the floor bottom surface 21 from deforming when the second fuel tank 15b is pushed from the lower side.

The form of the restricting member 29 is not specially limited, but, for example, the restricting member 29 may have a predetermined high strength as a material characteristic or may have a predetermined high strength in terms of structure, such as shape. In one example, the restricting member 29 may be a member obtained by bending one- or multi-layered steel sheet that has a high tensile strength and a predetermined thickness, or the like, or may be a structural member having a reinforcing structure, such as a rib. In some embodiments, the surface of the restricting member 29 onto which the second fuel tank 15b is to be pressed is made flat so as to not damage the second fuel tank 15b that is pressed thereonto.

3. Actions

The above describes the fuel cell vehicle 1 and the support structure of the fuel tanks 15 according to this embodiment. Next, actions of the fuel cell vehicle 1 and the support structure of the fuel tanks 15 according to this embodiment will be described.

Figure 8:
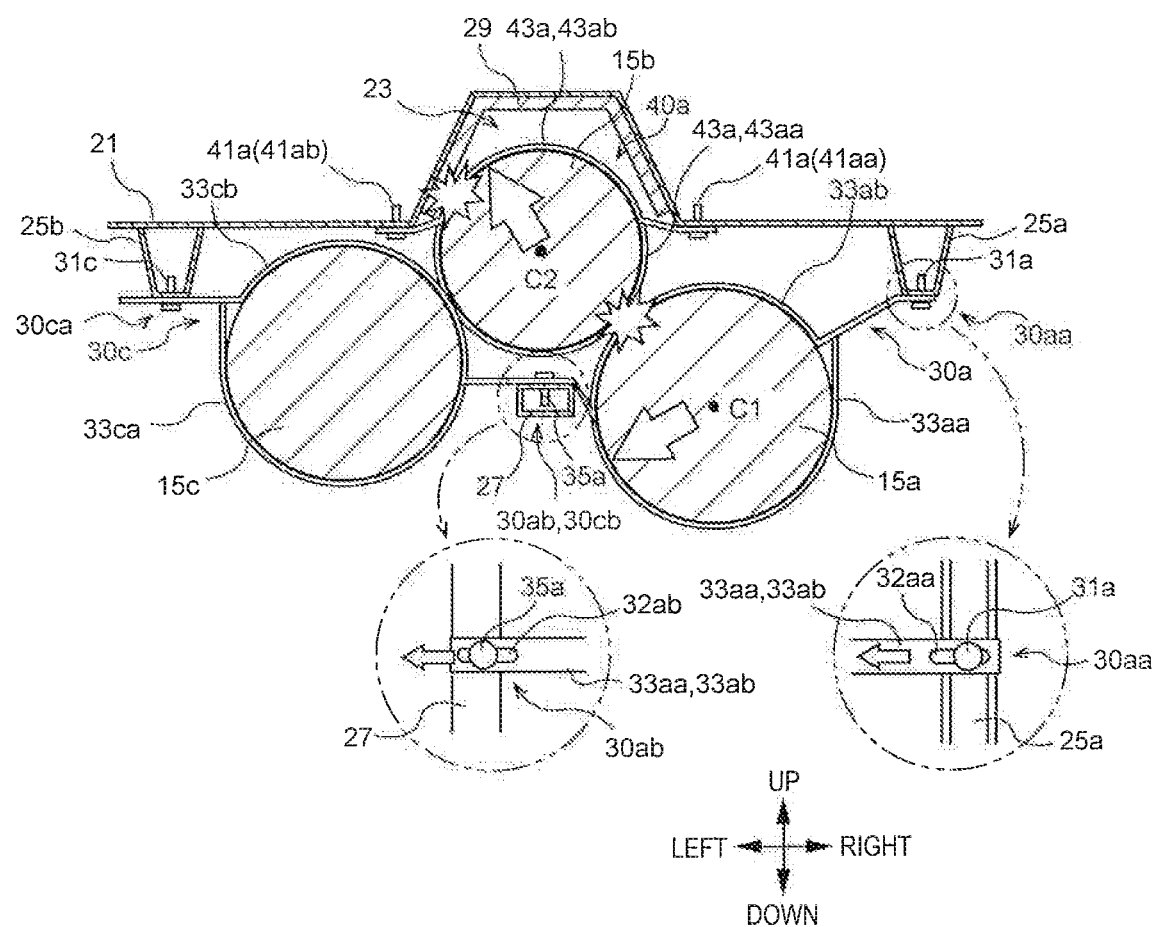
FIG. 8 is a diagram illustrating movements of the fuel tanks at the time of a side collision of the vehicle.

FIG. 8 is a diagram illustrating movements of the fuel tanks 15 in the support structure in FIG. 4, in which the movements of the fuel tanks 15 occur when a collision load acts on the first fuel tank 15a due to a side collision from a right side of the vehicle body where the first fuel tank 15a is positioned. FIG. 8 illustrates the first fixing part 30aa and the second fixing part 30ab of the first support mechanism 30a as viewed from a lower side and an upper side, respectively.

At the time of a side collision from the right side of the vehicle body, upon receiving a collision load from the right side in FIG. 8, the first fuel tank 15a is pushed toward the center side in the vehicle width direction. At that time, the first fuel tank 15a moves left while being guided by the long holes 32aa and 32ab, which are provided in the first support member 33a (lower bracket 33aa and upper bracket 33ab), and by the first fixing members 31a and 35a, which pass through the long holes 32aa and 32ab to be fixed to the side frame 25a and the tank support frame 27, respectively.

The first fuel tank 15a comes into contact with the second fuel tank 15b during the movement toward the center side in the vehicle width direction. At that time, the axial center C2 of the second fuel tank 15b is positioned higher than the first fuel tank 15a, and therefore, the first fuel tank 15a moves left downward while pushing the second fuel tank 15b upwardly. The first support member 33a for supporting the first fuel tank 15a is fixed to the side frame 25a by the first fixing member 31a, which passes through the long hole 32aa, and is also fixed to the tank support frame 27 by the first fixing member 35a, which passes through the long hole 32ab. Thus, the first fuel tank 15a is continuously held without falling off after it moves.

The second fuel tank 15b, which is pushed upward by the first fuel tank 15a, moves while being guided by the long holes 42aa and 42ab, which are provided in the second support member 43a (lower bracket 43aa and upper bracket 43ab) for supporting the second fuel tank 15b, and by the second fixing members 41aa and 41ab, which pass through the long holes 42aa and 42ab to be fixed to the floor bottom surface 21. Thus, the second fuel tank 15b is continuously held without coming off from the second support member 43a after being pushed.

In this situation, since the second fuel tank 15b is disposed under the vehicle cabin, it is to be prevented that the second fuel tank 15b is pushed upward to invade the vehicle cabin that houses an occupant. For this reason, the restricting member 29 that has a predetermined strength is provided above the second fuel tank 15b, whereby the possibility that the second fuel tank 15b invades the vehicle cabin is reduced.

In this manner, at the time of a side collision from the right side of the vehicle body, the first fuel tank 15a is restricted in the movement direction by the first support members 33a and 33b and the second fuel tank 15b and thus moves toward a lower center side in the vehicle width direction. The first support members 33a and 33b are movable toward the center side in the vehicle width direction by predetermined amounts and are configured to not come off from the first fixing members 31a, 31b, 35a, and 35b, whereby they are supported so as to not fall off from the vehicle body. The second fuel tank 15b, which is pushed upward by the first fuel tank 15a, is restricted in movement by the restricting member 29 provided in the upper recess 23, whereby the second fuel tank 15b is prevented from invading the vehicle cabin.

Similarly, also in the case of a side collision from the left side of the vehicle body, the third fuel tank 15c is restricted in the movement direction by the first support members 33c and 33d and the second fuel tank 15b and thus moves toward the lower center side in the vehicle width direction. The first support members 33c and 33d are movable toward the center side in the vehicle width direction by predetermined amounts and are configured to not come off from the first fixing members 31c, 31d, 35c, and 35d, whereby they are supported so as to not fall off from the vehicle body. The second fuel tank 15b, which is pushed upward by the third fuel tank 15c, is restricted in movement by the restricting member 29 provided in the upper recess 23, whereby the second fuel tank 15b is prevented from invading the vehicle cabin.

4. Advantages of Embodiments

As described above, in the fuel cell vehicle 1 according to this embodiment, the axial center C2 of the second fuel tank 15b on the center side in the vehicle width direction is positioned higher than the axial centers C1 and C3 of the first fuel tanks 15 (15a and 15c) on the outer sides in the vehicle width direction. In addition, the fuel tanks 15 (15a and 15c) on the outer sides in the vehicle width direction are supported while being allowed to move toward the lower side of the second fuel tank 15b, by the first support mechanisms 30a to 30d. Thus, at the time of a side collision, the fuel tanks 15 (15a and 15c), which are disposed on the outer sides in the vehicle width direction, move toward the lower side of the second fuel tank 15b at the middle in the vehicle width direction without falling off. This reduces the possibility of damage to the fuel tanks 15 due to mutual interference of the fuel tanks 15. Moreover, the restricting member 29 restricts the movement to the vehicle cabin of the second fuel tank 15b, which is configured to move the fuel tanks 15 (15a and 15c) that are disposed on the outer sides in the vehicle width direction, toward the lower center side in the vehicle width direction. This enables protecting occupants in the vehicle cabin.

The fuel cell vehicle 1 according to this embodiment includes the front wheel drive motor 9F and so on at the front part of the vehicle 1 and includes the rear wheel drive motor 9R and so on at the rear part of the vehicle 1. The plural fuel tanks 15 are longitudinally arranged under the rear seat 35 of the vehicle cabin between the front wheels 3LF and 3RF and the rear wheels 3LR and 3RR. Thus, an impact of a collision from the front side of the vehicle 1 is hardly transmitted to the fuel tanks 15. In addition, the rear wheel drive motor 9R and a rigid body for supporting thereof protect the fuel tanks 15 from a collision from the rear side of the vehicle 1. This reduces the possibility of damage to the fuel tanks 15 in case of occurrence of a collision from the front side or the rear side, as well as occurrence of a side collision from the right side or the left side.

In the fuel cell vehicle 1 according to this embodiment, the second fuel tank 15b at the middle in the vehicle width direction is partially disposed in the upper recess 23, which is provided in the floor bottom surface 21 of the vehicle body. In one example, the second fuel tank 15b is partially disposed in a space of a tunnel section in which a propeller shaft is disposed, in a conventional all-wheel-drive vehicle. Thus, the space for disposing the fuel tanks 15 is widely obtained, which makes it possible to increase the load amount of hydrogen gas.

In the fuel cell vehicle 1 according to this embodiment, the second fuel tank 15b at the middle in the vehicle width direction has a diameter that is smaller than the diameters of the fuel tanks 15 (15a and 15c) on the outer sides in the vehicle width direction. With this structure, the second fuel tank 15b is easy to partially dispose in the upper recess 23, whereby the fuel tanks 15 can be mounted away from a road surface.

The embodiment of the disclosure has been described in detail above with reference to the accompanying drawings. The disclosure is not limited to such an embodiment. It is apparent that those who have ordinary knowledge in the technical field to which the disclosure pertains would conceive various changes and modifications within the scope of the appended claims, and it is to be understood that such changes and modifications also fall within the technical scope of the disclosure.

For example, the structure of the support mechanism, which supports the fuel tanks 15 (15a and 15c) on the outer sides in the vehicle width direction while allowing them to move toward the lower side of the second fuel tank 15b, is not limited to the example described above. The first support member may not be a bracket and may employ another appropriate member. In one example, guide grooves or guide holes for restricting the movement directions of the fuel tanks 15 may be provided in the vehicle body, and fixing members may be fixed to such guide grooves to support each of the fuel tanks 15. The structure of the support mechanism can be variously modified.

As described above, the disclosure enables reducing damage to the plurality of longitudinally arranged fuel tanks and protecting occupants in the vehicle cabin, at the time of a side collision of the vehicle.

The invention claimed is:
1. A fuel cell vehicle comprising:
fuel tanks that are disposed in a vehicle width direction of the fuel cell vehicle so as to have respective longitudinal directions along a vehicle longitudinal direction of the fuel cell vehicle, the fuel tanks comprising a first fuel tank provided on an outer side in the vehicle width direction, and
a second fuel tank disposed adjacent to the first fuel tank, the second fuel tank having an axial center that is positioned higher than an axial center of the first fuel tank;
a first support mechanism configured to, in a case where a collision load acts from outside in the vehicle width direction, support the first fuel tank while allowing at least a lower end of the first fuel tank to move toward a lower side of the second fuel tank; and
a restricting member provided above the second fuel tank, the restricting member being configured to restrict an upward movement range of the second fuel tank, wherein
the first support mechanism comprises
a first support member that supports the first fuel tank, and
a first fixing member that fixes the first support member to a vehicle body of the fuel cell vehicle,
the first support member has a longitudinal direction along the vehicle width direction,
the first support member comprises a long hole through which the first fixing member passes, and
the first support member is movable in the vehicle width direction in the case where the collision load acts, and wherein an entirety of a periphery of the long hole is continuous.

2. The fuel cell vehicle according to claim 1, wherein the second fuel tank is partially disposed in an upper recess provided on a floor bottom surface of the vehicle body, and
the restricting member is provided in the upper recess.

3. The fuel cell vehicle according to claim 2, further comprising:
a second support mechanism that supports the second fuel tank, wherein
the second support mechanism comprises
a second support member that supports the second fuel tank, and
a second fixing member that fixes the second support member to the vehicle body,
the second support member has a longitudinal direction along the vehicle width direction,
the second support member comprises a long hole through which the second fixing member passes, and
the second support member is movable in the vehicle width direction in the case where the collision load acts.

4. The fuel cell vehicle according to claim 1, further comprising:
a second support mechanism that supports the second fuel tank, wherein
the second support mechanism comprises
a second support member that supports the second fuel tank, and
a second fixing member that fixes the second support member to the vehicle body,
the second support member has a longitudinal direction along the vehicle width direction,
the second support member comprises a long hole through which the second fixing member passes, and
the second support member is movable in the vehicle width direction in the case where the collision load acts.

5. A fuel cell vehicle comprising:
fuel tanks that are disposed in a vehicle width direction of the fuel cell vehicle so as to have respective longitudinal directions along a vehicle longitudinal direction of the fuel cell vehicle, the fuel tanks comprising
a first fuel tank provided on an outer side in the vehicle width direction, and
a second fuel tank disposed adjacent to the first fuel tank, the second fuel tank having an axial center that is positioned higher than an axial center of the first fuel tank;
a first support mechanism configured to, in a case where a collision load acts from outside in the vehicle width direction, support the first fuel tank while allowing the first fuel tank to move toward a lower side of the second fuel tank; and
a restricting member provided above the second fuel tank, the restricting member being configured to restrict an upward movement range of the second fuel tank, wherein
the first support mechanism comprises
a first support member that supports the first fuel tank, and
a first fixing member that fixes the first support member to a vehicle body of the fuel cell vehicle,
the first support member has a longitudinal direction along the vehicle width direction,
the first support member comprises a long hole through which the first fixing member passes, and
the first support member is movable in the vehicle width direction in the case where the collision load acts, and wherein
the first fixing member is positioned on a center side in the vehicle width direction in the long hole of the first support member, and
the first fixing member fixes the first support member to the vehicle body.

6. The fuel cell vehicle according to claim 5, wherein the second fuel tank is partially disposed in an upper recess provided on a floor bottom surface of the vehicle body, and
the restricting member is provided in the upper recess.

7. The fuel cell vehicle according to claim 6, further comprising:
a second support mechanism that supports the second fuel tank, wherein
the second support mechanism comprises
a second support member that supports the second fuel tank, and
a second fixing member that fixes the second support member to the vehicle body,
the second support member has a longitudinal direction along the vehicle width direction,
the second support member comprises a long hole through which the second fixing member passes, and
the second support member is movable in the vehicle width direction in the case where the collision load acts.

8. The fuel cell vehicle according to claim 5, further comprising:
a second support mechanism that supports the second fuel tank, wherein
the second support mechanism comprises
a second support member that supports the second fuel tank, and
a second fixing member that fixes the second support member to the vehicle body,
the second support member has a longitudinal direction along the vehicle width direction,
the second support member comprises a long hole through which the second fixing member passes, and the second support member is movable in the vehicle width direction in the case where the collision load acts.

9. The fuel cell vehicle according to claim 5, wherein an entirety of a periphery of the long hole is continuous.

\* \* \* \* \*